UNITED STATES PATENT OFFICE.

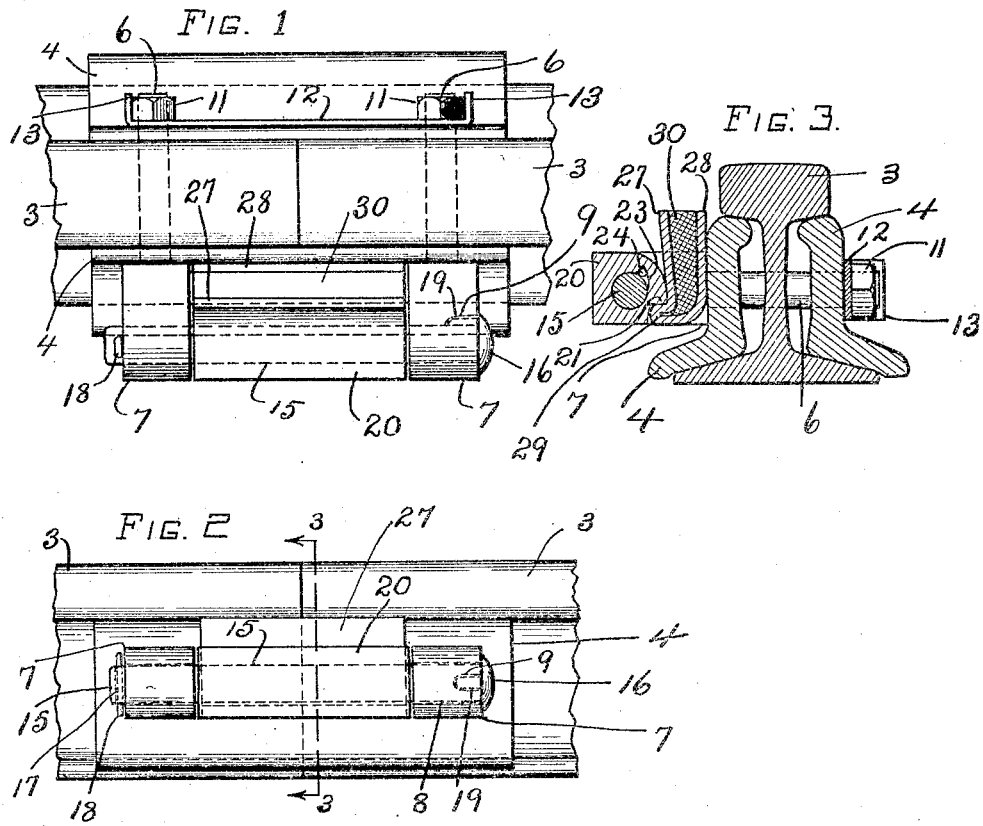

JOHN WOLFE, OF CLEVELAND, OHIO, ASSIGNOR OF ONE-HALF TO THOMAS J. McMANUS, OF CLEVELAND, OHIO, AND ONE-HALF TO U. S. METAL & MANUFACTURING CO., OF NEW YORK, N. Y., A CORPORATION OF NEW JERSEY.

RAIL-JOINT.

983,591.

Specification of Letters Patent. Patented Feb. 7, 1911.

Application filed April 24, 1909. Serial No. 491,949.

*To all whom it may concern:*

Be it known that I, JOHN WOLFE, a citizen of the United States of America, residing at Cleveland, in the county of Cuyahoga and State of Ohio, have invented certain new and useful Improvements in Rail-Joints; and I hereby declare the following to be a full, clear, and exact description of the invention, such as will enable others skilled in the art to which it pertains to make and use the same.

This invention relates to new and useful improvements in rail-joints and particularly to an improvement on a joint of the type set forth and described in my application Serial No. 460,432.

The object of this invention is to provide a rail joint which while embodying all the advantages of the joint described in my application above referred to will be more simple in construction and more positive in action.

My invention therefore consists in the features of construction and combination of parts described in the specification, pointed out in the claims and illustrated in the accompanying drawings.

In the accompanying drawings Figure 1 is a top plan of a joint embodying my invention. Fig. 2 is a side elevation of same. Fig. 3 is a section on line 3—3, Fig. 2.

Again referring to the drawings, 3 represents rails of the usual construction with their ends abutting to form a continuous section of track. At each side of the rails, at the joint, are arranged fish-plates 4 of the usual construction so as to span the joint and overlap the ends of the rails at each side of the joint. Bolts 6 are passed through the fish-plates and the abutting ends of the rails. The said bolts are provided with enlarged heads 7 in which are formed openings 8 which have small recesses 9 communicating therewith. The bolts 6 have the usual screw-threaded ends arranged to receive nuts 11 of the usual construction. Any suitable locking device may be provided for holding the nuts against movement and as shown said locking device consists of a plate 12 through which the ends of bolts extend and, after the nuts 11 are secured onto the bolts, portions of the said plate, as shown at 13, are bent up at the sides of the said nuts and thereby prevent their turning.

A shaft or bolt 15 extends between the heads 7 of the bolts 6 and the ends thereof extend through the openings 8 in the heads 7. The shaft or bolt 15 is preferably provided at one end with a head 16 and at the opposite end with a small opening 17 which is adapted to receive a pin 18 which locks the said bolt against longitudinal movement. The bolt 15 is also provided with fins 19 near the head thereof which fit into the recesses 9 in the heads of the bolts 6 and thereby prevent the shaft or bolt 15 from rotating.

On the shaft or bolt 15 is mounted a cam block 20. The face of this cam block 20 is curved eccentric to both the axis of the cam and the axis of the supporting shaft 15, curving outwardly and downwardly from the top edge of the cam face so that the face of the cam has its greatest eccentricity near the lower end of the cam face. The cam face is also cut away at its lower edge to form a shoulder 21. In the wall of the bore of the cam block is formed a longitudinally extending recess 23. This recess is deepest at its top and in the deep portion thereof is arranged a pin 24. It will be understood that as the cam block 20 rotates downwardly the pin 24 will be in the deep part of the said recess, leaving the cam block free to rotate downwardly, but in case the cam block should for any reason be given an impulse which would tend to rotate the cam upwardly, then the pin 24 will move into the shallow portion of the recess 23 and thereby lock the cam block 20 to the supporting shaft 15 and prevent any upward movement thereof.

Between the cam block 20 and the adjacent fish-plate is arranged a resilient locking wedge. This locking wedge is arranged to extend across the entire face of the cam and is preferably formed by bending or doubling up a resilient sheet or plate in the form of the letter U, and thereby forming two divergent members 27 and 28, and also an extension or toe-piece 29. The space between the members 27 and 28 is preferably filled with a suitable elastic material 30 such as a hard rubber composition which reinforces the resilient action of the members 27 and 28.

In assembling the joint it will be understood that the fish-plates are rigidly clamped to the rails by tightening the nuts 11 on the ends of the bolts 6 in the usual manner. The cam block 20 is then mounted between the heads of the bolts 6 by means of the shaft 15, but before the cam is turned down into its operative position the resilient wedge is inserted between the cam block and the adjacent fish-plate with the toe-piece of the wedge under the shoulder on the face of the cam block, and then the cam block is turned in and down thereby forcing down the resilient wedge. The forcing down of the resilient wedge will cause the two divergent members thereof to approach each other so that the wedge will be under considerable tension and in case the bolts 6 stretch or elongate the said wedge will expand and the action thereof will draw the bolts 6 through the rails and the fish-plate so that the nuts on the bolts will be held tightly against the fish-plate adjacent thereto. If there is more stretch to the bolts 6 than can be taken care of by the simple expansion of the divergent members of the wedge then the wedge will move down farther between the cam block and the fish-plate, the shape of the curved face of the cam allowing the cam block to rotate down freely as the wedge moves downward.

What I claim is,—

1. In a device of the character indicated, the combination with two rails arranged to form a joint and a fish-plate arranged to span said joint, of a block supported in proximity to said fish-plate and a resilient locking wedge interposed between said block and said fish-plate, said wedge being provided with a projection arranged to extend under the lower edge of said block.

2. In a device of the character indicated, the combination with two rails arranged to form a joint and a fish-plate arranged to span said joint, of a block supported in proximity to said fish-plate and a U-shaped resilient locking wedge interposed between said block and said fish-plate, said wedge being provided with a projection arranged to extend under the lower edge of the said block.

3. In a device of the character indicated, the combination with two rails arranged to form a joint and a fish-plate arranged to span said joint, of a block supported in proximity to said fish-plate, of a resilient locking wedge interposed between said block and said fish-plate, said wedge comprising two diverging members, one of which is in contact with the block and the other in contact with the said fish-plate.

4. In a device of the character indicated, the combination with two rails arranged to form a joint and a fish-plate arranged to span said joint, of a block supported in proximity to said fish-plate and a resilient locking wedge interposed between said block and said fish-plate, said wedge comprising a sheet of resilient material bent to form two divergent members, one of which is in contact with the block and the other is in contact with the fish-plate.

5. In a device of the character indicated, the combination with two rails arranged to form a joint and a fish-plate arranged to span said joint, of a block supported in proximity to said fish-plate and a resilient locking wedge interposed between said block and said fish-plate, said wedge comprising a sheet of resilient material bent to form two diverging members, one of which is in contact with the face of the cam and the other is in contact with the fish-plate and an elastic filling arranged between the said members.

6. In a device of the character indicated, the combination with two rails arranged to form a joint and a fish-plate arranged to span said joint of a block supported in proximity to said fish-plate and a resilient U-shaped locking wedge interposed between said block and said fish-plate and means for reinforcing the resiliency of said wedge.

7. In a device of the character indicated, the combination of two rails arranged to form a joint and a fish-plate arranged to span said joint, of a shaft, a cam block rotatably supported on said shaft and a resilient locking wedge interposed between the face of the cam block and the fish-plate, said wedge being provided with a projection arranged to extend under the lower edge of said block.

8. In a device of the character indicated, the combination of two rails arranged to form a joint and a fish-plate arranged to span said joint, of a shaft, a cam block supported on said shaft and a U-shaped resilient locking wedge interposed between said block and said fish-plate said wedge being provided with a projection arranged to extend under the lower edge of the said block.

9. In a device of the character indicated, the combination of two rails arranged to form a joint and a fish-plate arranged to span said joint, of a shaft, a cam block rotatably supported on said shaft and a resilient locking wedge interposed between said block and said fish-plate, said wedge comprising two divergent members, one of which is in contact with the block and the other in contact with the said fish-plate.

10. In a device of the character indicated, the combination of two rails arranged to form a joint and a fish-plate arranged to span said joint, of a shaft, a cam block rotatably supported on said shaft and a resilient locking wedge interposed between said block and said fish-plate, said wedge comprising a sheet of resilient material bent to form two divergent members, one of which is in contact with the block and the other is in contact with the fish-plate.

11. In a device of the character indicated, the combination of two rails arranged to form a joint and a fish-plate arranged to span said joint, of a shaft, a cam block rotatably supported on said shaft and a resilient locking wedge interposed between said block and said fish-plate, said wedge comprising a sheet of resilient material bent to form two divergent members, one of which is in contact with the face of the cam and the other is in contact with the fish-plate and an elastic filling arranged between the said members.

12. In a device of the character indicated, the combination of two rails arranged to form a joint and a fish-plate arranged to span said joint, of a shaft, a cam block rotatably supported on said shaft and a resilient U-shaped locking wedge interposed between said block and said fish-plate and means for reinforcing the resiliency of said wedge.

13. In a device of the character indicated, the combination of two rails arranged to form a joint, and a plate arranged to span said joint, of a shaft, a cam block rotatably supported on said shaft, said cam block having the face thereof curved eccentrically with the axis of said block and a resilient locking wedge consisting of a plate folded upon itself arranged between the said cam block and the said fish-plate and means for holding said resilient wedge against upward movement.

14. In a device of the character indicated, the combination of two rails arranged to form a joint, and a plate arranged to span said joint, of a shaft, a cam block rotatably supported on said shaft, means for preventing the upward rotation of said cam block while leaving it free to rotate downwardly, and a resilient locking wedge consisting of a plate folded upon itself arranged between the said cam block and the said fish-plate and means for holding said resilient wedge against upward movement.

15. In a device of the character indicated, the combination with two rails arranged to form a joint and fish-plates arranged to span said joint, of bolts for clamping said fish-plates in position, said bolts being provided with enlarged heads having openings therein, a supporting shaft mounted in the said heads, a cam block arranged on said shaft and a resilient locking wedge interposed between said cam block and the adjacent fish-plate.

16. In a device of the character indicated, the combination with two rails arranged to form a joint and fish-plates arranged to span said joint, of bolts for clamping said fish-plates in position, said bolts being provided with enlarged heads having openings therein, a supporting shaft mounted in said heads, means for preventing the rotation of said shaft, a cam block arranged on said shaft, means for preventing the upward rotation of said cam block while leaving it free to rotate downwardly and a resilient locking wedge interposed between said cam block and the adjacent fish-plate, said wedge being provided with means for engaging with said cam block so as to prevent the upward movement of said wedge.

17. In a device of the character indicated, the combination with two rails arranged to form a joint and fish-plates arranged to span said joint, of bolts for clamping the fish-plates in position, said bolts being provided with enlarged heads, a shaft having its ends supported in said heads means for locking said shaft against rotation, a cam block mounted on said shaft and having a recess formed in the wall of the bore thereof, said recess being larger at its upper end than at its lower end, a pin arranged in said recess and a resilient locking wedge interposed between the face of said cam and the adjacent fish-plate.

18. In a device of the character indicated, the combination with two rails arranged to form a joint and plates arranged to span said joint, of bolts for clamping said plates to said rails, said bolts being provided with enlarged heads, a shaft supported by the heads of said bolts, means for locking said shaft against rotation, a cam block mounted on said shaft, means for locking said cam against upward rotation while leaving it free to rotate downwardly, the face of said cam being arranged to come in contact with the fish-plate at each end of the cam block, but having the intermediate portion of the face recessed and a wedge arranged in said recessed portion.

19. In a device of the character indicated, the combination with two rails arranged to form a joint and plates arranged to span said joint, of bolts for clamping said plates to said rails, said bolts being provided with enlarged heads, a shaft supported by the heads of said bolts, means for locking said shaft against rotation, a cam block mounted on said shaft, means for locking said cam against upward rotation while leaving it free to rotate downwardly, the face of said cam being arranged to come in contact with the fish-plate at each end of the cam block, but having the intermediate portion of the face recessed and a wedge arranged in said recessed portion and provided with means for engaging the lower edge of the said cam block.

20. In a device of the character indicated, the combination with two rails arranged to form a joint and plates arranged to span said joint, of bolts for clamping said plates to said rails, said bolts being provided with enlarged heads, a shaft supported by the heads of said bolts, means for locking said shaft against rotation, a cam block mounted on said shaft, means for locking said cam against upward rotation while leaving it free to rotate downwardly, the face of said cam being arranged to come in contact with the fish-plate at each end of the cam block, but having the intermediate portion of the face recessed and a resilient wedge arranged in said recessed portion.

In testimony whereof, I sign the foregoing specification, in the presence of two witnesses.

JOHN WOLFE.

Witnesses:
VICTOR C. LYNCH,
T. J. MCMANUS.